United States Patent
Raynal et al.

(10) Patent No.: US 9,355,506 B2
(45) Date of Patent: May 31, 2016

(54) METHOD FOR MANAGING FAULT MESSAGES OF A MOTOR VEHICLE

(71) Applicants: CONTINENTAL AUTOMOTIVE FRANCE, Toulouse (FR); CONTINENTAL AUTOMOTIVE GmbH, Hannover (DE)

(72) Inventors: Benoit Raynal, Toulouse (FR); Ludovic Rocher, Balma (FR)

(73) Assignees: CONTINENTAL AUTOMOTIVE FRANCE, Toulouse (FR); CONTINENTAL AUTOMOTIVE GMBH, Hannover (DE)

( * ) Notice: Subject to any disclaimer, the term of this patent is extended or adjusted under 35 U.S.C. 154(b) by 0 days.

(21) Appl. No.: 14/751,610

(22) Filed: Jun. 26, 2015

(65) Prior Publication Data
US 2015/0379788 A1 Dec. 31, 2015

(30) Foreign Application Priority Data
Jun. 27, 2014 (FR) ...................... 14 56020

(51) Int. Cl.
*G07C 5/08* (2006.01)
*B60W 50/029* (2012.01)
*B60W 50/00* (2006.01)

(52) U.S. Cl.
CPC ........... *G07C 5/0808* (2013.01); *B60W 50/029* (2013.01); *G07C 5/085* (2013.01); *G07C 5/0816* (2013.01); *B60W 2050/0006* (2013.01)

(58) Field of Classification Search
CPC .................. G06F 11/00; G07C 5/08
See application file for complete search history.

(56) References Cited

U.S. PATENT DOCUMENTS

| 7,877,627 | B1* | 1/2011 | Freydel ............... G06F 11/1633 714/11 |
| 8,412,389 | B2* | 4/2013 | Tessier ................... G01C 21/16 701/1 |
| 2006/0149885 | A1 | 7/2006 | Sistla et al. |
| 2009/0216929 | A1* | 8/2009 | Heller .................. G06F 9/4812 710/266 |
| 2011/0301772 | A1* | 12/2011 | Zuercher ........... H01L 31/02021 700/293 |
| 2012/0216202 | A1* | 8/2012 | Douros .................. G06F 9/542 718/102 |
| 2013/0024589 | A1 | 1/2013 | Yamauchi et al. |
| 2014/0067192 | A1 | 3/2014 | Yousuf |
| 2014/0229957 | A1 | 8/2014 | Zhang et al. |

FOREIGN PATENT DOCUMENTS

| CN | 102567120 B | 7/2012 |
| CN | 102646059 A | 8/2012 |
| DE | 102009028871 A1 | 3/2011 |

(Continued)

OTHER PUBLICATIONS

French Search Report, dated Mar. 20, 2015, from corresponding French application.

*Primary Examiner* — Thomas Tarcza
*Assistant Examiner* — Alex C Dunn
(74) *Attorney, Agent, or Firm* — Young & Thompson

(57) ABSTRACT

A method for managing fault messages (m) of a motor vehicle by a monitoring computer of a motor vehicle, the monitoring computer including a step (E1) of receiving a fault message (m), a filtering step (E3) in which the method executes a step (E4) of storing the fault message (m) in a temporary storage memory (TMP) in case of positive filtering and a step (E5) of storing the fault messages (m) in a dynamic storage memory (DYN).

14 Claims, 4 Drawing Sheets

(56) References Cited

FOREIGN PATENT DOCUMENTS

| | | | |
|---|---|---|---|
| DE | 102013216444 | A1 | 3/2014 |
| EP | 1770509 | A2 | 4/2007 |
| FR | 2930828 | A1 | 11/2009 |
| GB | 20050019981 | A1 | 4/2007 |
| JP | 2011237929 | A | 11/2011 |
| WO | 9826958 | A1 | 6/1998 |
| WO | 2006029152 | A2 | 6/2006 |
| WO | 2009014868 | A2 | 1/2009 |
| WO | 2011121730 | A1 | 10/2011 |
| WO | 2012092894 | A2 | 7/2012 |

* cited by examiner

METHOD FOR MANAGING FAULT MESSAGES OF A MOTOR VEHICLE

FIELD OF THE INVENTION

The present invention relates to the field of managing faults of a motor vehicle.

BACKGROUND OF THE INVENTION

Conventionally, a motor vehicle comprises numerous pieces of equipment (thermal or electric engine, gearbox, etc.) which may develop faults during the life of the vehicle. Consequently there is a known way of monitoring said vehicle during its operation or while it is stationary, for the purpose of detecting faults and storing them in a dynamic memory of the vehicle. Because of the storage of the faults in the dynamic memory, a mechanic can easily and reliably determine the cause of the faults for the purpose of repairing said vehicle.

Conventionally, a motor vehicle comprises a monitoring computer which comprises said dynamic memory and which performs various diagnostic functions, each diagnostic function being configured to detect a predetermined fault (injector short circuit, or the like). In practice, the monitoring computer executes numerous different diagnostic functions in order to determine numerous predetermined faults. In a known way, the monitoring computer is the computer which executes the engine control operations.

If the execution of a diagnostic function indicates the presence of a fault, a fault message is stored in the dynamic memory of the monitoring computer. In a known way, each fault message has a priority ranking, making it possible to determine whether the fault message is important (high ranking) or unimportant (low ranking).

Owing to technical constraints, the dynamic memory has a limited number of memory spaces for storing fault messages. For example, the dynamic memory may have 10 memory spaces to enable 10 fault messages to be stored. Clearly, there could be a different number of spaces.

In practice, when the dynamic memory is full, only the most important fault messages are added to the dynamic memory, in place of the less important messages. Thus, advantageously, when a mechanic consults the dynamic memory he is certain to see the most important fault messages, which must be dealt with urgently.

Conventionally, the monitoring computer has a single processing processor, the monitoring computer being called a "single-core computer". With a single processing processor, the various diagnostic functions are executed in a synchronous manner, one after another, without any risk of interruption. Thus the fault messages are stored sequentially in the dynamic memory. By way of example, with reference to FIG. 1, the single processor P1 executes the diagnostic functions DIAG A-DIAG D successively. Since the diagnostic functions DIAG B-DIAG D indicate that a fault is present, fault messages m B, m C, m D are stored in a synchronous manner in the dynamic memory DYN.

To improve the monitoring of a motor vehicle, it has been proposed that a greater number of diagnostic functions be executed in order to detect a greater number of different faults. This is because, as the complexity of vehicles increases, the number of potential faults also increases. Furthermore, specific faults must be monitored to comply with pollution prevention regulations or other statutory regulations.

To enable the monitoring computer to execute a large number of diagnostic functions, it has been proposed that a plurality of processors be used simultaneously, in which case the monitoring computer is called a "multi-core computer". This is because a single-core monitoring computer cannot execute a large number of diagnostic functions, in particular, because of the factors of computing power and heat dissipation.

When a plurality of processors are used simultaneously to execute diagnostic functions, fault messages can be generated simultaneously by the monitoring computer, which may result in write conflicts. By way of example, with reference to FIG. 2, two processors P1, P2 simultaneously execute diagnostic functions DIAG A-DIAG H. In this example, the fault messages m D, m G are generated simultaneously by the processors P1, P2, resulting in a write conflict in the dynamic memory DYN.

Since it is impossible to write simultaneously to the dynamic memory, because it is not shared, it has been proposed that a shared queue memory be used, the fault messages being stored temporarily in this memory before being stored sequentially in the dynamic memory by a single specified processor.

The temporary memory, also called a "queue", is a memory of the FIFO type, this term corresponding to the English designation "First In First Out". This queue memory is used in numerous other applications of the monitoring computer and cannot be modified.

During the monitoring of the vehicle, the various fault messages sent by the various processors of the monitoring computer are collected according to their order of arrival in the temporary memory. Subsequently, at regular time intervals, one of the processors of the monitoring computer empties the temporary memory in order to fill the dynamic memory, in a sequential manner. In a similar way to what takes place in a "single-core" monitoring computer, the most important fault messages in the queue memory are stored in the dynamic memory with priority over the less important fault messages. By way of example, with reference to FIG. 3, two processors P1, P2 simultaneously execute diagnostic functions DIAG A-DIAG H. In this example, the fault messages m D, m G are generated simultaneously by the processors P1, P2, and are stored in the temporary memory TMP which is shared. One of the processors P1, P2 then sequentially writes the data in the temporary memory TMP into the dynamic memory DYN.

A problem arises regarding the definition of the size of the temporary memory of the monitoring computer, given that dynamic memory allocation is not permitted for this critical type of application. If the size of the temporary memory is too small, it is possible that some fault messages may not be collected by the temporary memory, and will therefore have no chance of being stored in the dynamic memory. This drawback is particularly critical if the fault message uncollected by the temporary memory is an important fault message having a high priority ranking.

Consequently it has been proposed that a temporary memory size corresponding to the total number of possible fault messages (about 300 memory spaces) be used in order to avoid any loss of an important fault message. In practice, this temporary memory size is too great, as it results in drawbacks in industrial terms, particularly as regards cost.

SUMMARY OF THE INVENTION

The object of the invention is therefore to overcome these drawbacks by proposing a method for managing fault messages which allows all the important fault messages to be stored in a reliable manner, while limiting the size of the temporary FIFO memory for which dynamic memory allocation is not permitted.

To this end, the invention relates to a method for managing fault messages of a motor vehicle by means of a monitoring computer of a motor vehicle, said monitoring computer comprising:

At least two processing processors which are adapted, on the one hand, to execute a plurality of fault diagnostic functions on the equipment of said motor vehicle, and, on the other hand, to send a fault message if a fault is detected during the execution of a fault diagnostic function, each fault message having a priority ranking;

A temporary memory, of the "first in first out" (FIFO) type without dynamic memory allocation, adapted to store fault messages, said temporary memory having a predetermined number of storage spaces for storing fault messages;

A dynamic memory for storing fault messages to be read by a mechanic's diagnostic tool, said dynamic memory having a predetermined number of storage spaces for storing fault messages, At least one of the processors being adapted to store the fault messages of the temporary storage memory in the dynamic storage memory, A predetermined filtering index associating a filtering decision with an input pair composed of the priority ranking of a fault message and the number of temporary spaces occupied in the temporary storage memory on the arrival of said fault message, where said filtering decision may be a storage authorization or a refusal of storage;

Said filtering index associating a storage authorization with an input pair in which the number of temporary spaces occupied in the temporary storage memory is low and in which the priority ranking of said fault message is high;

Said filtering index associating a refusal of storage with an input pair in which the number of temporary spaces occupied in the temporary storage memory is high and in which the priority ranking of said fault message is low; The method comprising:

A step of receiving a fault message sent by one of the processing processors,

A step of forming an input pair composed of the priority ranking of said fault message and the number of spaces in the temporary storage memory which are occupied, A filtering step in which, if the filtering decision associated with said input pair by the reading of said predetermined filtering index is a storage authorization, the method executes a step of storing said fault message in the temporary storage memory, and A step in which the fault messages of the temporary storage memory are stored in the dynamic storage memory by one of the processors, on the basis of the priority ranking of the fault messages of the temporary storage memory, the priority ranking of the fault messages of the dynamic storage memory, and the number of spaces of the dynamic storage memory which are empty.

As a result of the invention, a filtering step is executed before the fault messages are stored in the temporary memory, in order to avoid the storage of fault messages which are not suitable for storage in the dynamic memory readable by the mechanic.

Advantageously, the filtering is based on the priority ranking of the fault messages to be stored and the number of spaces of the temporary storage memory which are occupied, in order to favor the most important messages while the temporary memory fills up. This step is particularly useful, since it is impossible to withdraw unimportant fault messages from the temporary memory, which is of the FIFO type.

Finally, the size of the temporary memory may advantageously be limited in order to reduce its cost, thereby achieving a considerable advantage.

Preferably, the filtering index associating a predetermined storage threshold with each priority ranking of the fault message, the method comprises, during the filtering step:

A step of determining the storage threshold associated with said priority ranking of the fault message, A step of comparing said storage threshold with the number of occupied spaces of the temporary storage memory, and A step of delivering authorization if the storage threshold is greater than the number of occupied spaces of the temporary storage memory.

By using a specified storage threshold in the filtering index, it is possible to calibrate, for each priority ranking of a fault message $m_r$, the number of memory spaces reserved for the messages having the most important priority. In other words, each fault storage threshold makes it possible to ensure that the most important fault messages will be stored in the temporary memory, even if the temporary memory is partially filled.

Preferably, each storage threshold $P(m_r)$ conforms to the following formula:

$$P(m_r) \leq m_r * N_{DYN}$$

where $N_{DYN}$ denotes the number of storage spaces in the dynamic memory and $m_r$ denotes the priority ranking of the fault messages.

By defining the storage threshold in this way, it can be ensured that all the most important fault messages will be stored in the dynamic memory, regardless of the order of arrival of the fault messages. This characteristic is particularly beneficial because it allows the size of the temporary memory to be considerably reduced.

Thus, preferably, the number of temporary memory spaces $N_{TMP}$ conforms to the following formula:

$$N_{TMP} \leq N_{mr} * N_{DYN}$$

where $N_{mr}$ denotes the number of priority rankings of the fault messages, and where $N_{DYN}$ denotes the number of storage spaces in the dynamic memory. The size of the temporary memory is optimized to ensure that all of the most important fault messages are received.

Preferably, the first storage threshold associated with the fault messages having the lowest priority, that is to say the least important messages, is at least equal to the number $N_{DYN}$ of storage spaces in the dynamic memory. Thus, if only the less important fault messages (such as those concerning intermittent faults) are detected, which is the most common case, it is certain that the dynamic memory will be entirely filled so that the mechanic can access all the information.

Preferably, each storage threshold $P(m_r)$ conforms to the following formula for $m_r$ greater than 1:

$$P(m_r) = K(m_r) * N_{DYN} + P(m_{r-1})$$

where the coefficient $K(m_r)$ is a weighting coefficient in the range from 0 to 1, and where $N_{DYN}$ denotes the number of storage spaces in the dynamic memory.

Advantageously, each storage threshold is weighted so as to limit the size of the dynamic memory. This weighting is possible, on the one hand, because it is highly unlikely that messages will be received in the least favorable order, and, on the other hand, because the probability of receiving a large number of fault messages with a high ranking is low. Furthermore, the number of fault messages having a given ranking may be lower than the number of spaces in the dynamic memory. In fact, there is no point in reserving 10 memory spaces for the highest priority ranking if there are only 4 or 5 different fault messages with the highest ranking.

Preferably, the first storage threshold is equal to the number $N_{DYN}$ of storage spaces in the dynamic memory. Because of this characteristic, the size of the shared temporary memory is considerably reduced. According to a preferred aspect, the coefficient is identical for each priority ranking greater than 1.

BRIEF DESCRIPTION OF THE DRAWINGS

The invention will be more clearly understood with the aid of the following description, provided solely by way of example, with reference to the attached drawings, in which.

DETAILED DESCRIPTION OF THE INVENTION

Figure 1:
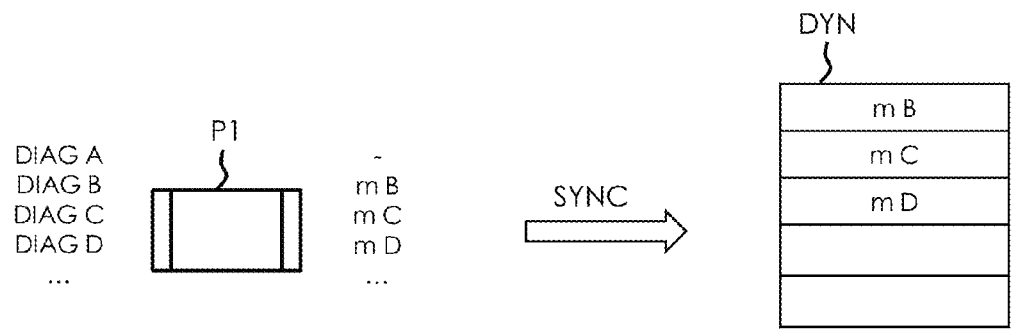
FIG. 1 is a schematic representation of a fault management method according to the prior art, with a computer having a single processor.
Figure 2:
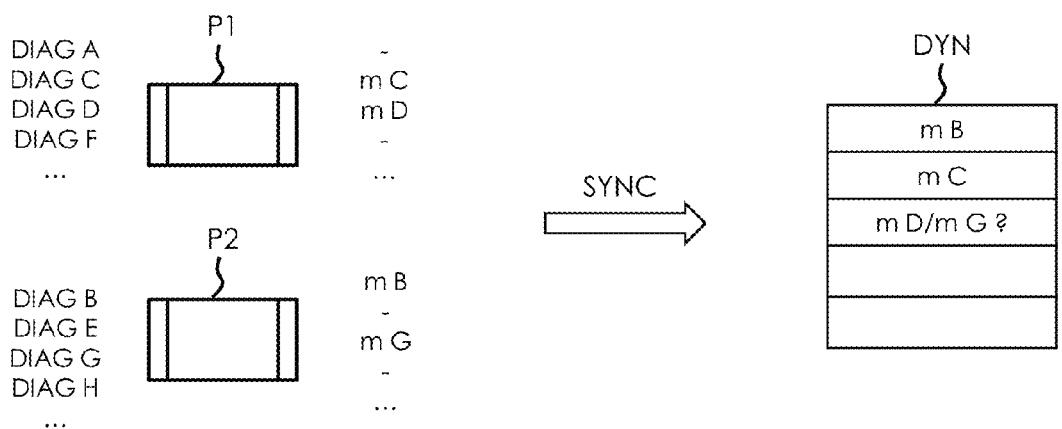
FIG. 2 is a schematic representation of a fault management method with a computer having two processors.
Figure 3:
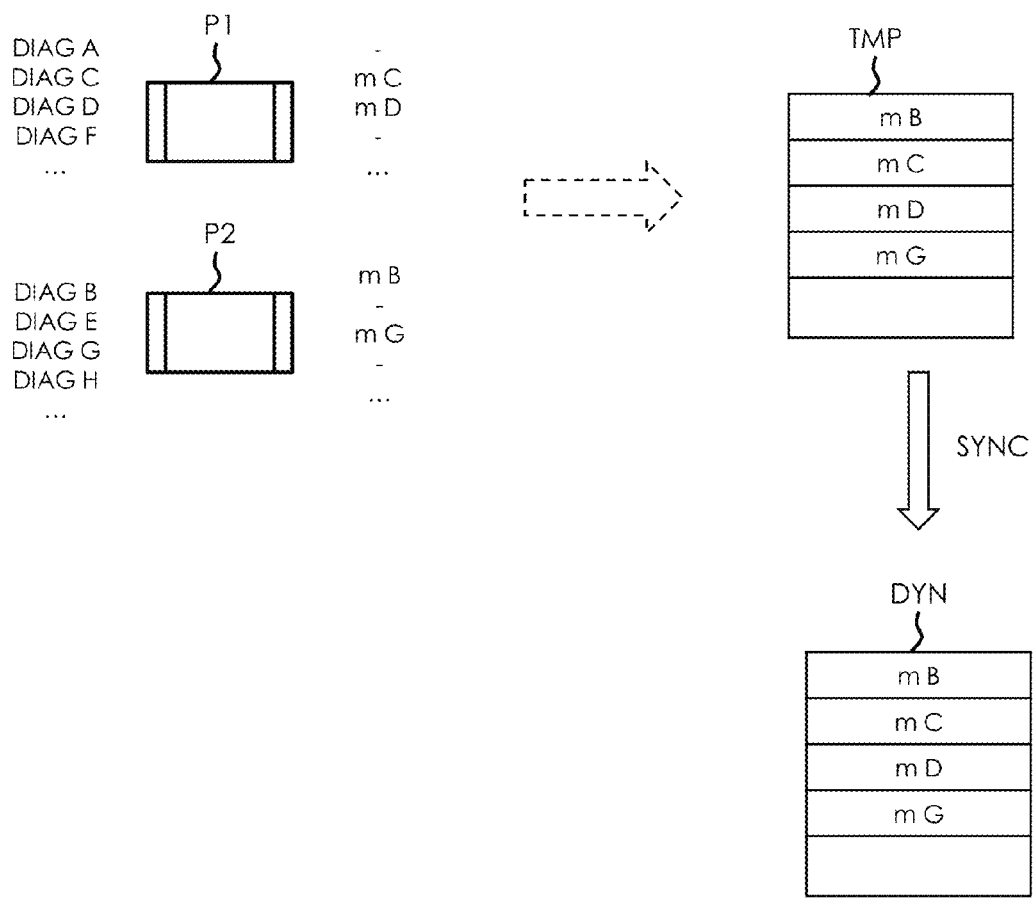
FIG. 3 is a schematic representation of a fault management method with a computer having two processors and a shared temporary memory.
Figure 4:
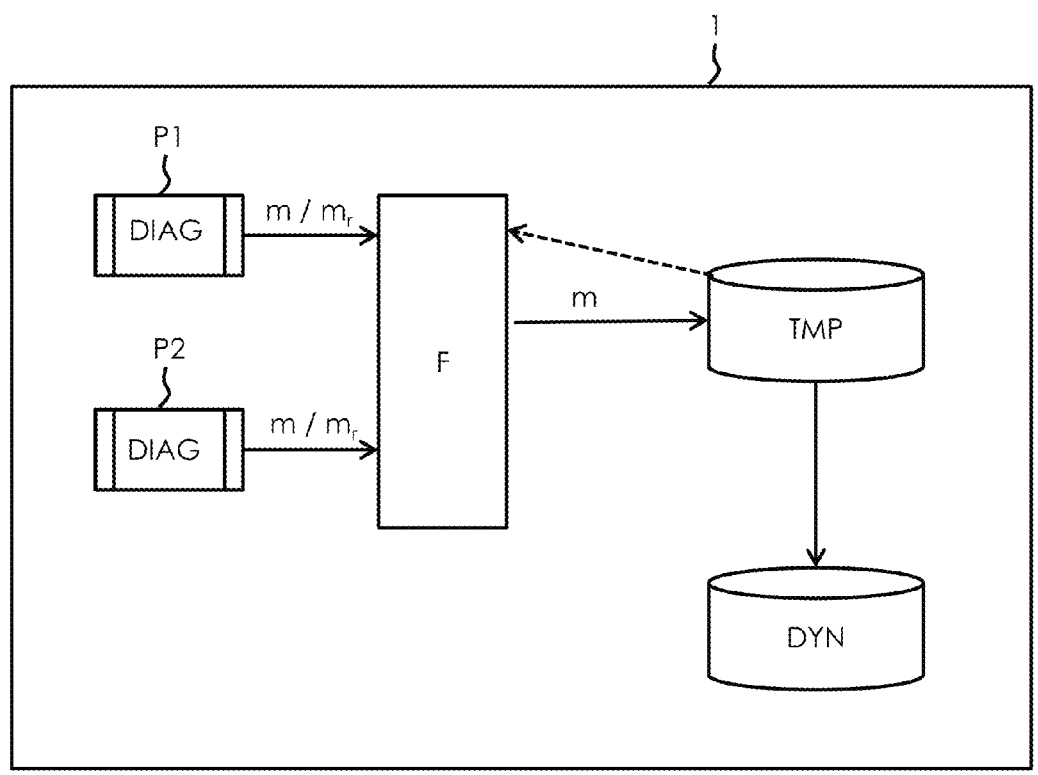
FIG. 4 is a schematic representation of a fault management method according to the invention with a filtering index.

It should be noted that the figures show the invention in a detailed manner for the purpose of applying the invention, said figures obviously being usable in order to define the invention more closely if necessary. With reference to FIG. 4, the invention will be described for a monitoring computer 1 for a motor vehicle adapted to diagnose faults in the equipment of said vehicle, for example faults in the engine, the exhaust systems, the safety equipment, and the like.

Still with reference to FIG. 4, said monitoring computer 1 comprises two processing processors P1, P2 which are adapted, on the one hand, to execute a plurality of fault diagnostic functions DIAG on the equipment of said motor vehicle, and, on the other hand, to send a fault message m if a fault is detected during the execution of a fault diagnostic function DIAG. In this example, the processors P1, P2 are connected to equipment sensors of the motor vehicle in order to acquire parameters measured by these sensors (temperature, speed, voltage, etc.). Since the monitoring computer 1 has a plurality of processors P1, P2, the monitoring computer 1 is a multi-core computer.

As shown in FIG. 4, each fault message m corresponds to a predetermined fault and has a priority ranking m, associated with the importance or criticality of the fault.

In this example, the priority ranking may take 9 different values, which in this example are defined between 1 and 9 for the sake of clarity, although obviously the priority rankings could take different values. The faults with the ranking 1 are those described as intermittent, and are the least critical (defective headlight bulb, door open, etc.). Conversely, faults with the ranking 9 are critical faults (airbag deployment, etc.).

Again with reference to FIG. 4, the monitoring computer 1 has a temporary memory, of the "first in first out" (FIFO) type without dynamic memory allocation, adapted to store fault messages m, said temporary memory TMP having a predetermined number $N_{TMP}$ of storage spaces for storing fault messages m. The temporary memory TMP is a shared memory in which writing can be carried out sequentially following the reception of simultaneous write requests. In practice, the shared temporary memory includes a semaphore or token mechanism known to those skilled in the art for the sequential writing of simultaneous write requests. The storage spaces in the temporary memory TMP are either empty or occupied. In other words, the temporary memory TMP has a number $N_{TMP-o}$ of occupied storage spaces and a number $N_{TMP-v}$ of empty storage spaces, making up a total number of spaces $N_{TMP}$. As mentioned previously, this type of memory is predetermined by the architecture of the monitoring computer 1, and cannot be changed.

The monitoring computer 1 further comprises a dynamic memory DYN for storing fault messages m, which is to be read by a mechanic's diagnostic tool. In a conventional way, a mechanic has a reading device available, comprising a connecting socket which can be connected to the dynamic memory DYN of the monitoring computer 1 so as to read the stored fault messages m. The mechanic's reading device is adapted to suggest the most probable malfunctions of the vehicle according to the faults detected.

The dynamic memory DYN has a predetermined number $N_{DYN}$ of storage spaces for storing fault messages m. Unlike the temporary memory TMP, the dynamic memory DYN is not a shared memory, and can be written to only in a synchronized manner by a single processor P1, P2, as described below. In a similar manner to the temporary memory TMP, the storage spaces in the dynamic memory DYN are either empty or occupied. In other words, the dynamic memory DYN has a number $N_{DYN-o}$ of occupied storage spaces and a number $N_{DYN-v}$ of empty storage spaces, making up a total number of spaces $N_{DYN}$.

Figure 5:
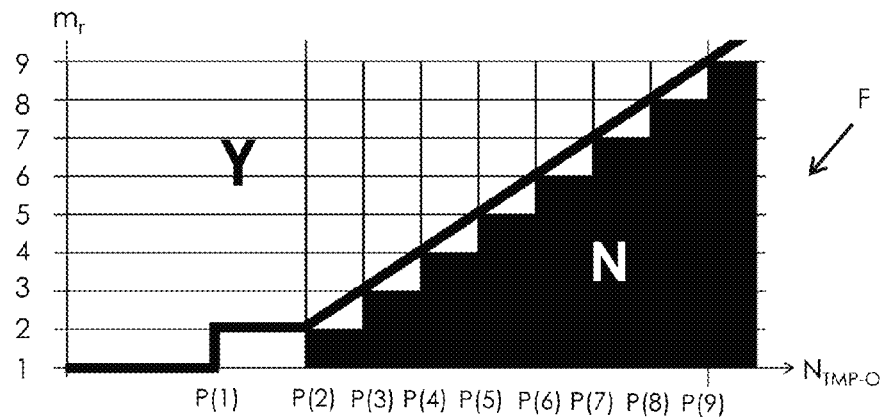
FIG. 5 is a schematic representation of an exemplary embodiment of a filtering index according to the invention.

With reference to FIG. 5, this shows, in graphic form, a filtering index F according to a preferred embodiment of the invention, which associates a filtering decision with an input pair composed of the priority ranking $m_r$ of a fault message and the number $N_{TMP-O}$ of temporary spaces occupied in the temporary storage memory TMP on the arrival of said fault message m. Said filtering decision is either a storage authorization Y or a storage refusal N. As shown in FIG. 5, a storage authorization Y is represented by a while rectangle, while a storage refusal N is represented by a black rectangle.

Overall, with reference to FIG. 5, said filtering index F associates a storage authorization Y with an input pair in which the number $N_{TMP-O}$ of temporary spaces occupied in the temporary storage memory TMP is low and in which the priority ranking $m_r$ of said fault message m is high. Conversely, said filtering index F associates a storage refusal N with an input pair in which the number $N_{TMP-O}$ of temporary spaces occupied in the temporary storage memory TMP is high and in which the priority ranking $m_r$ of said fault message m is low.

Preferably, with reference to FIG. 5, the filtering index F associates a storage authorization Y with intermittent fault messages m, that is to say those whose ranking $m_r$ is equal to 1, provided that a given number of spaces P(1) in the temporary memory TMP is not occupied. This number of spaces P(1) is referred to below as the storage threshold. In this embodiment, a storage threshold P is associated with each priority ranking $m_r$. Thus the priority rankings $m_r$ having values of 1-9 are respectively associated with storage thresholds P(1)-P(9).

If a fault message m with a priority ranking $m_r$ is subjected to the filtering index F, the latter receives a storage authorization Y only if the number $N_{TMP-O}$ of temporary spaces occupied in the temporary storage memory TMP is below the storage threshold P associated with said priority ranking $m_r$.

Preferably, the first storage threshold P(1) is equal to the number $N_{DYN}$ of storage spaces in the dynamic memory DYN [P(1)=$N_{DYN}$]. In other words, if it is only the intermittent faults, that is to say the less critical and non-permanent ones, that are detected by the monitoring computer 1, the temporary memory TMP stores only a sufficient number of fault messages m with a ranking of $m_r$=1 to fill the whole of the dynamic memory DYN. Any greater amount of storage of messages with the ranking 1 would be excessive, since the dynamic memory DYN has a limited size.

Because of the filtering index F, the size of the temporary memory TMP is limited and spaces are reserved for the most important fault messages, as detailed below.

Similarly, the filtering index F associates a storage authorization Y with fault messages m whose ranking $m_r$=2, provided that a given number of spaces P(2) in the temporary memory TMP is not occupied.

According to a first aspect, the second threshold P(2) of the temporary memory TMP is equal to $2 \times N_{DYN}$, thus allowing all the messages with a ranking $m_r$=2 to be stored in the dynamic memory DYN without risk of loss.

In fact the worst-case reception scenario is that of receiving a large number of fault messages m with a ranking $m_r$=1, followed by a large number of fault messages m with a ranking $m_r$=2. According to this scenario, only the P(1) first messages with a ranking $m_r$=1 are stored, and then only the P(2)-P(1) first messages with a ranking $m_r$=2 are stored in the temporary memory TMP. During the synchronized filling of the dynamic memory DYN with the messages in the temporary memory TMP, the messages m with a ranking $m_r$=1 will be initially stored in the dynamic memory DYN, and will then be replaced by the messages m with a ranking $m_r$=2, since these take priority over the messages with a ranking $m_r$=1. Ultimately, the dynamic memory DYN will be filled solely with messages with a ranking of 2, thereby meeting the desired objective of storing the most important fault messages m.

Similarly, the filtering index F associates a storage authorization Y with fault messages m with a given ranking $m_r$, provided that a given number of spaces P($m_r$) in the temporary memory TMP is not occupied. Preferably, the limit number of spaces P($m_r$) in the temporary memory TMP is equal to $m_r \times N_{DYN}$, thus allowing all the messages with a ranking of $m_r$ to be stored in the dynamic memory DYN without risk of loss.

$$P(m_r)=m_r * N_{DYN}$$

According to this definition of the filtering index F, the number of spaces $N_{TMP}$ in the temporary memory TMP is equal to the number of priority rankings $N_{mr}$ multiplied by the number of memory spaces $N_{DYN}$ in the dynamic memory:

$$N_{TMP}=N_{mr} * N_{DYN}$$

Thus, if $N_{DYN}$ is equal to 10, the resulting number of spaces $N_{TMP}$ in the temporary memory TMP is 90. The size of the temporary memory TMP is thus considerably reduced by comparison with the prior art, which proposed that the temporary memory should be of a size capable of storing all the possible fault messages, that is to say more than 300. As a result of the invention, the size of the temporary memory TMP is reduced by at least 70%.

As described previously, the number of memory spaces $N_{TMP}$ in the temporary memory TMP is defined so as to allow all the most important fault messages m to be received even when the fault messages m are received in the least favorable order of reception possible, that is to say a successive reception of 10 fault messages with a ranking of 1, 10 fault messages with a ranking of 2, 10 fault messages with a ranking of 3, and so on.

According to another embodiment of the filtering index F, each storage threshold P is defined as follows for $m_r$ greater than 1:

$$P(m_r)=K(m_r) * N_{DYN} + P(m_{r-1})$$

The coefficient $K(m_r)$ is a weighting coefficient in the range from 0 to 1. This weighting coefficient $K(m_r)$ for a fault message m with a ranking $m_r$ is advantageous because it enables the number of memory spaces $N_{TMP}$ in the temporary memory TMP to be reduced while allowing for the very low probability that fault messages will arrive in a successive manner and for the fact that the fault messages m with high rankings ($m_r$>8) are few in number. Preferably, the weighting coefficient $K(m_r)$ is in the range from 0.2 to 1 for each ranking $m_r$ of a fault message m.

Preferably, $K_1$ is equal to 1 so as to allow the dynamic memory DYN to be filled with all the fault messages with a ranking of 1, corresponding to intermittent faults. Preferably, for $m_r$ greater than 1, $K(m_r)$ is in the range from 0.2 to 0.5, and is preferably of the order of 0.3.

By way of example, the number of spaces $N_{TMP}$ in the temporary memory TMP is equal to:

$$N_{TMP}=1 * N_{DYN} + 0.3 * (Nmr-1) * N_{DYN}$$

In the present example, for fault messages m having 9 priority rankings and with a dynamic memory DYN with 10 memory spaces, the number $N_{TMP}$ of spaces in the temporary memory TMP is of the order of 34.

$$10+0.3*(9-1)*10=3.4*10=34$$

The size of the temporary memory TMP is thus considerably reduced by comparison with the prior art, in which it was proposed that the temporary memory should be of a size capable of storing all the possible fault messages, that is to say more than 300. As a result of the invention, the size of the temporary memory TMP is reduced by nearly 90%.

Because of the filtering index F, it is possible to propose a temporary memory TMP of limited size which has a low cost, allowing it to be fitted in a motor vehicle having a multi-core monitoring computer 1.

Figure 6:
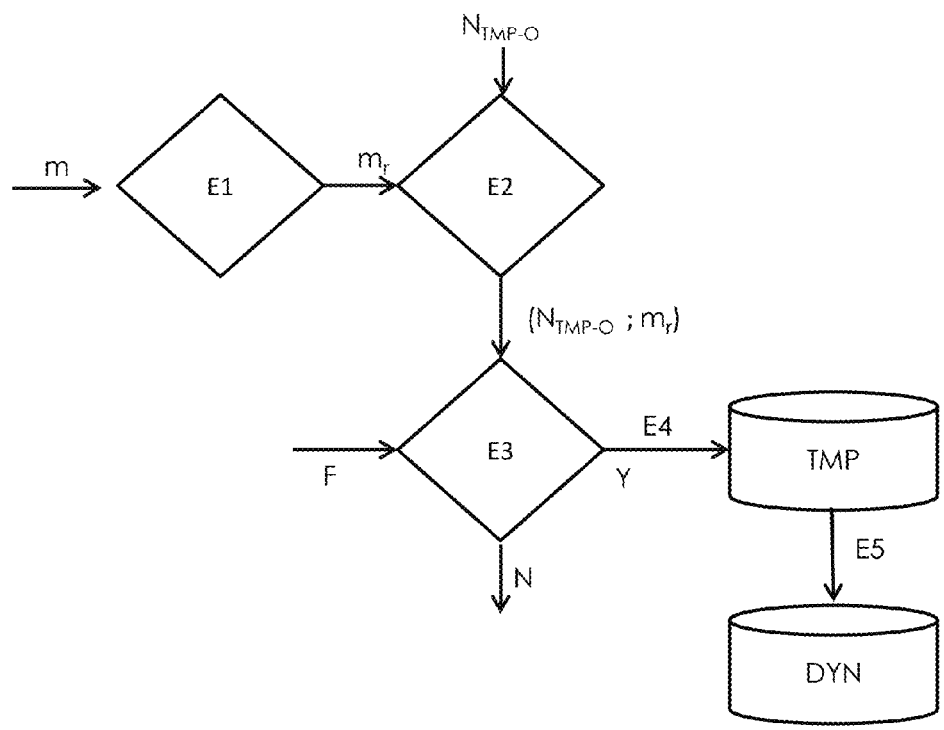
FIG. 6 is a schematic diagram of the steps of the fault management method according to the invention.

An exemplary embodiment of the invention will now be described with reference to FIG. 6.

The method for managing fault messages m comprises, in the first place, a step E1 of receiving a fault message m sent by one of the processing processors P1, P2. As mentioned previously, fault messages m may arrive simultaneously, since the monitoring computer 1 has a plurality of processors P1, P2.

The method then comprises a step E2 of forming an input pair composed of the priority ranking $m_r$ of said fault message and the number $N_{TMP-O}$ of spaces in the temporary storage memory TMP which are occupied.

The method comprises a filtering step E3 in which, if the filtering decision associated with said input pair ($N_{TMP-O}$; $m_r$) by the reading of said predetermined filtering index F is a storage authorization Y, the method executes a step E4 of storing said fault message m in the temporary storage memory TMP. Otherwise, if the filtering decision associated with said input pair ($N_{TMP-O}$; $m_r$) by the reading of said predetermined filtering index F is a storage refusal N, the fault message m is rejected.

In practice, the method comprises a step of determining the storage threshold $P(m_r)$ associated with said priority ranking $m_r$ of the fault message m, followed by a step of comparing said storage threshold $P(m_r)$ with the number $N_{TMP-O}$ of spaces in the temporary storage memory TMP which are occupied. If the storage threshold $P(m_r)$ is higher, a storage authorization Y is delivered; otherwise, a storage refusal N is delivered.

By way of example, if $K(m_r)=0.3$ for $m_r>1$, the filtering index F comprises the following thresholds:

| $m_r$ | 1 | 2 | 3 | 4 | 5 | 6 | 7 | 8 | 9 |
|---|---|---|---|---|---|---|---|---|---|
| $P(m_r)$ | 10 | 13 | 16 | 19 | 22 | 25 | 28 | 31 | 34 |

If the filtering index receives the following fault messages in consecutive order:

| No. | $m_r$ | $N_{TMP-O}$ |
|---|---|---|
| 1 | 1 | 1 |
| 2 | 1 | 2 |
| 3 | 1 | 3 |
| 4 | 1 | 4 |
| 5 | 1 | 5 |
| 6 | 1 | 6 |
| 7 | 1 | 7 |
| 8 | 2 | 8 |
| 9 | 1 | 9 |
| 10 | 1 | 10 |
| <u>11</u> | <u>1</u> | 10 |
| 12 | 2 | 11 |
| 13 | 5 | 12 |
| 14 | 4 | 13 |
| <u>15</u> | <u>1</u> | 13 |
| <u>16</u> | <u>1</u> | 13 |
| <u>17</u> | <u>2</u> | 13 |
| <u>18</u> | <u>1</u> | 13 |
| <u>19</u> | <u>1</u> | 13 |
| 20 | 5 | 14 |
| <u>21</u> | <u>1</u> | 14 |
| <u>22</u> | <u>1</u> | 14 |
| 23 | 5 | 15 |
| 24 | 5 | 16 |
| 25 | 5 | 17 |
| <u>26</u> | <u>3</u> | 17 |
| <u>27</u> | <u>1</u> | 17 |
| <u>28</u> | <u>1</u> | 17 |
| <u>29</u> | <u>1</u> | 17 |
| <u>30</u> | <u>1</u> | 17 |

In the above table, the underlined fault messages do not receive a storage authorization.

Fault message no. 11 does not receive authorization for storage in the temporary memory, because the first storage threshold P(1) has been reached. It is no longer possible to store any other message with a ranking of $m_r=1$. On the other hand, fault message no. 12 receives authorization for storage in the temporary memory, because the second storage threshold P(2) has not been reached. However, message no. 17 does not receive authorization for storage in the temporary memory, because the second storage threshold P(2) has been reached. This procedure continues for the other fault messages.

The method then comprises a step E5 in which the fault messages m in the temporary storage memory TMP are stored, preferably in a batch manner, in the dynamic storage memory DYN by one of the processors P1, P2, on the basis of the priority ranking $m_r$ of the fault messages m of the temporary storage memory TMP, the priority ranking $m_r$ of the fault messages m in the dynamic storage memory DYN, and the number $N_{DYN-v}$ of spaces $N_{DYN}$ of the dynamic storage memory DYN which are empty. In a similar manner to the prior art, when the dynamic memory DYN is full, only the most important fault messages m are added to the dynamic memory, in place of the least important messages m. Thus, advantageously, when a mechanic consults the dynamic memory he is certain to see the most important fault messages, which must be dealt with urgently.

As a result of the invention, the fault messages m are stored in the dynamic memory DYN in a reliable manner for a monitoring computer 1 having a plurality of cores, in order to detect a greater number of different faults. The diagnosis carried out by a mechanic is even more precise and more reliable, which is advantageous. Furthermore, the size of the temporary memory TMP is reduced in an optimal manner in order to reduce its cost while maintaining very high reliability.

The invention claimed is:

1. A method for managing fault messages (m) of a motor vehicle by means of a monitoring computer of a motor vehicle, said monitoring computer comprising:
    At least two processing processors (P1, P2) which are adapted, on the one hand, to execute a plurality of fault diagnostic functions (DIAG) on the equipment of said motor vehicle, and, on the other hand, to send a fault message (m) if a fault is detected during the execution of a fault diagnostic function (DIAG), each fault message (m) having a priority ranking (mr),
    A temporary memory (TMP), of the "first in first out" (FIFO) type without dynamic memory allocation, adapted to store fault messages (m), said temporary memory (TMP) having a predetermined number (NTMP) of storage spaces for storing fault messages (m),
    A dynamic memory (DYN) for storing fault messages (m) to be read by a mechanic's diagnostic tool, said dynamic memory (DYN) having a predetermined number (NDYN) of storage spaces for storing fault messages (m),
    At least one of the processors (P1, P2) being adapted to store the fault messages (m) of the temporary storage memory (TMP) in the dynamic storage memory (DYN),
    A predetermined filtering index (F) associating a filtering decision with an input pair composed of the priority ranking (mr) of a fault message (m) and the number (NTMP-O) of temporary spaces occupied in the temporary storage memory (TMP) on the arrival of said fault message (m), where said filtering decision may be a storage authorization (Y) or a storage refusal (N),
    Said filtering index (F) associating a storage authorization (Y) with an input pair in which the number (NTMP-O) of temporary spaces occupied in the temporary storage memory (TMP) is low and in which the priority ranking (mr) of said fault message (m) is high,
    Said filtering index associating a storage refusal (N) with an input pair in which the number (NTMP-O) of temporary spaces occupied in the temporary storage memory (TMP) is high and in which the priority ranking (mr) of said fault message (m) is low,
    the method comprising:
    A step (E1) of receiving a fault message (m) sent by one of the processing processors (P1, P2),
    A step (E2) of forming an input pair composed of the priority ranking (mr) of said fault message (m) and the number (NTMP-O) of spaces in the temporary storage memory (TMP) which are occupied, A filtering step (E3) in which, if the filtering decision associated with said input pair by the reading of said predetermined filtering index (F) is a storage authorization (Y), the method executes a step (E4) of storing said fault message (m) in the temporary storage memory (TMP) and A step (E5) in which the fault messages (m) in the temporary storage memory (TMP) are stored in the dynamic storage memory (DYN) by one of the processors (P1, P2), on the basis of the priority ranking (mr) of the fault messages (m) of the temporary storage memory (TMP), the priority ranking (mr) of the fault messages (m) in the dynamic storage memory (DYN), and the number (NDYN-V) of spaces (NDYN) of the dynamic storage memory (DYN) which are empty.

2. The method for managing fault messages (m) as claimed in claim 1, wherein, the filtering index (F) associating a predetermined storage threshold P(mr) with each priority ranking (mr) of the fault message (m), the method comprises, during the filtering step (E3):

A step of determining the storage threshold P(mr) associated with said priority ranking (mr) of the fault message (m), A step of comparing said storage threshold P(mr) with the number (NTMP-O) of occupied spaces of the temporary storage memory (TMP), and A step of delivering authorization (Y) if the storage threshold P(mr) is greater than the number (NTMP-O) of occupied spaces of the temporary storage memory (TMP).

3. The method for managing fault messages (m) as claimed in claim 2, wherein each storage threshold P(mr) conforms to the following formula:

$$P(m_r) \le m_r * N_{DYN}$$

where NDYN denotes the number of storage spaces in the dynamic memory (DYN).

4. The method for managing fault messages (m) as claimed in claim 2, wherein the number of spaces NTMP in the temporary memory conforms to the following formula:

$$N_{TMP} \le N_{mr} * N_{DYN}$$

where Nmr denotes the number of priority rankings (mr) of the fault messages (m), and where NDYN denotes the number of storage spaces in the dynamic memory (DYN).

5. The method for managing fault messages (m) as claimed in claim 2, wherein the first storage threshold P(1) is equal to the number NDYN of storage spaces in the dynamic memory (DYN).

6. The method for managing fault messages (m) as claimed in claim 1, wherein each storage threshold P(mr) conforms to the following formula for mr greater than 1:

$$P(m_r) = K(m_r) * N_{DYN} + P(m_{r-1})$$

where the coefficient K(mr) is a weighting coefficient in the range from 0 to 1, and where NDYN denotes the number of storage spaces in the dynamic memory DYN.

7. The method for managing fault messages (m) as claimed in claim 6, wherein the coefficient K(mr) is a weighting coefficient in the range from 0.2 to 0.5 for a priority ranking (mr) greater than 1.

8. The method for managing fault messages (m) as claimed in claim 3, wherein the number of spaces NTMP in the temporary memory conforms to the following formula:

$$N_{TMP} \le N_{mr} * N_{DYN}$$

where Nmr denotes the number of priority rankings (mr) of the fault messages (m), and where NDYN denotes the number of storage spaces in the dynamic memory (DYN).

9. The method for managing fault messages (m) as claimed in claim 3, wherein the first storage threshold P(1) is equal to the number NDYN of storage spaces in the dynamic memory (DYN).

10. The method for managing fault messages (m) as claimed in claim 4, wherein the first storage threshold P(1) is equal to the number NDYN of storage spaces in the dynamic memory (DYN).

11. The method for managing fault messages (m) as claimed in claim 2, wherein each storage threshold P(mr) conforms to the following formula for mr greater than 1:

$$P(m_r) = K(m_r) * N_{DYN} + P(m_{r-1})$$

where the coefficient K(mr) is a weighting coefficient in the range from 0 to 1, and where NDYN denotes the number of storage spaces in the dynamic memory DYN.

12. The method for managing fault messages (m) as claimed in claim 3, wherein each storage threshold P(mr) conforms to the following formula for mr greater than 1:

$$P(m_r) = K(m_r) * N_{DYN} + P(m_{r-1})$$

where the coefficient K(mr) is a weighting coefficient in the range from 0 to 1, and where NDYN denotes the number of storage spaces in the dynamic memory DYN.

13. The method for managing fault messages (m) as claimed in claim 4, wherein each storage threshold P(mr) conforms to the following formula for mr greater than 1:

$$P(m_r) = K(m_r) * N_{DYN} + P(m_{r-1})$$

where the coefficient K(mr) is a weighting coefficient in the range from 0 to 1, and where NDYN denotes the number of storage spaces in the dynamic memory DYN.

14. The method for managing fault messages (m) as claimed in claim 5, wherein each storage threshold P(mr) conforms to the following formula for mr greater than 1:

$$P(m_r) = K(m_r) * N_{DYN} + P(m_{r-1})$$

where the coefficient K(mr) is a weighting coefficient in the range from 0 to 1, and where NDYN denotes the number of storage spaces in the dynamic memory DYN.

* * * * *